US010428665B2

United States Patent
Tracey et al.

(10) Patent No.: US 10,428,665 B2
(45) Date of Patent: Oct. 1, 2019

(54) CMC THERMAL CLAMPS

(71) Applicant: General Electric Company, Schenectady, NY (US)

(72) Inventors: Bradford Alan Tracey, Cold Spring, KY (US); Thomas Lipinski, Monroe, OH (US); Donald George LaChapelle, West Chester, OH (US); Michael Murrish, Norwood, OH (US)

(73) Assignee: General Electric Company, Schenectady, NY (US)

( * ) Notice: Subject to any disclaimer, the term of this patent is extended or adjusted under 35 U.S.C. 154(b) by 445 days.

(21) Appl. No.: 14/966,268

(22) Filed: Dec. 11, 2015

(65) Prior Publication Data

US 2017/0167280 A1      Jun. 15, 2017

(51) Int. Cl.
    *F01D 9/04*      (2006.01)
    *F01D 25/24*     (2006.01)
    *F02C 3/04*      (2006.01)

(52) U.S. Cl.
    CPC ............. *F01D 9/041* (2013.01); *F01D 9/042* (2013.01); *F01D 25/246* (2013.01); *F02C 3/04* (2013.01);
    (Continued)

(58) Field of Classification Search
    CPC ........ F01D 9/041; F01D 9/042; F01D 25/246; F01D 5/186; F01D 11/08; F01D 11/005;
    (Continued)

(56) References Cited

U.S. PATENT DOCUMENTS

| 1,625,612 A | * | 4/1927 | Jensen | .................. F16B 5/0048 16/262 |
| 3,195,393 A | * | 7/1965 | Iwao | ....................... F16B 21/12 411/513 |

(Continued)

FOREIGN PATENT DOCUMENTS

| EP | 2 554 795 A2 | 2/2013 |
| WO | 2011/047693 A1 | 4/2011 |
| WO | 2015/105654 A1 | 7/2015 |

OTHER PUBLICATIONS

Extended European Search Report and Opinion issued in connection with corresponding EP Application No. 16202998.7 dated May 8, 2017.

*Primary Examiner* — Thai Ba Trieu
*Assistant Examiner* — Loren C Edwards
(74) *Attorney, Agent, or Firm* — Dority & Manning, P.A.

(57) ABSTRACT

A clamping assembly includes a shaft, a first plurality of clamps, and a second plurality of clamps. Each of the first and the second pluralities of clamps includes a first wall, a second wall extending outwardly from the first wall in a first direction, and a third wall extending outwardly from the first wall in a second direction. Each of the first plurality of clamps is longitudinally spaced apart by one of the second plurality of clamps. The second walls of the first plurality of clamps are transversely spaced apart from the second walls of the second plurality of clamps. The first and the second walls of the first and the second pluralities of clamps collectively define a first slot that receives the shaft. The first and the third walls of the first and the second pluralities of clamps collectively define a second slot for receiving adjacent components.

20 Claims, 7 Drawing Sheets

(52) U.S. Cl.
CPC ...... *F05D 2220/32* (2013.01); *F05D 2230/60* (2013.01); *F05D 2230/64* (2013.01); *F05D 2240/128* (2013.01); *F05D 2240/35* (2013.01); *F05D 2260/30* (2013.01); *F05D 2260/36* (2013.01); *F05D 2260/39* (2013.01); *F05D 2300/10* (2013.01); *F05D 2300/50212* (2013.01); *F05D 2300/6033* (2013.01); *Y02T 50/672* (2013.01)

(58) Field of Classification Search
CPC .... F02C 3/04; F05D 2220/32; F05D 2230/60; F05D 2240/128; F05D 2240/35; F05D 2260/30; F05D 2300/10; F05D 2300/50212; F05D 2300/6033; F16B 3/00; F16B 3/04; F16B 3/06; F16B 3/005; F16B 5/0052; F16B 5/004; F16B 5/0048
USPC .......................................................... 60/805
See application file for complete search history.

(56) References Cited

U.S. PATENT DOCUMENTS

| | | | | |
|---|---|---|---|---|
| 4,832,568 | A | * | 5/1989 | Roth ................ F01D 9/042 415/189 |
| 6,112,934 | A | * | 9/2000 | Jung ................ E05B 65/006 220/265 |
| 6,514,046 | B1 | * | 2/2003 | Morrison ............ F01D 5/187 416/229 A |
| 2014/0147264 | A1 | | 5/2014 | Belmonte et al. |
| 2014/0255179 | A1 | * | 9/2014 | Fielding ............. F01D 9/041 415/208.2 |

* cited by examiner

CMC THERMAL CLAMPS

FEDERALLY SPONSORED RESEARCH

This invention was made with government support under contract number FA8650-09-D-2922 of the U.S. Government. The government may have certain rights in the invention.

FIELD OF THE INVENTION

The present disclosure relates generally to a gas turbine engine and, more particularly, to a clamping assembly for a gas turbine engine.

BACKGROUND OF THE INVENTION

A gas turbine engine generally includes, in serial flow order, a compressor section, a combustion section, a turbine section, and an exhaust section. In operation, air enters an inlet of the compressor section where one or more axial compressors progressively compress the air until it reaches the combustion section. Fuel mixes with the compressed air and burns within the combustion section, thereby creating combustion gases. The combustion gases flow from the combustion section through a hot gas path defined within the turbine section and then exit the turbine section via the exhaust section.

The turbine section includes one or more rows of turbine nozzles, which direct the flow of combustion gases onto one or more rows of turbine rotor blades. The turbine blades, in turn, extract kinetic energy from the combustion gases. These nozzles generally operate in extremely high temperature environments. As such, the nozzles may be constructed from a ceramic matrix composite ("CMC") or other suitable material capable of withstanding the high temperature exhaust gases.

The CMC turbine nozzles in each row generally must be coupled together to form an annular arrangement thereof. Nevertheless, metallic fasteners are unsuitable for coupling each the CMC turbine nozzles to each adjacent turbine nozzle at high temperatures. More specifically, metallic materials have a greater coefficient of thermal expansion than CMC materials. In this respect, the metallic fasteners expand at a greater rate than the CMC turbine nozzles. As such, the metallic fasteners may outgrow the CMC nozzles, thereby providing less clamping force to couple the turbine nozzles at high temperatures. This could allow combustion gases to escape between the turbine nozzle segments, which could reduce the efficiency of the gas turbine. Accordingly, a clamping assembly that maintains or increases clamping force at higher temperatures would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a clamping assembly for coupling adjacent components. The clamping assembly includes a shaft, a first plurality of clamps, and a second plurality of clamps. Each of the first plurality of clamps and the second plurality of clamps includes a first wall, a second wall extending outwardly from the first wall in a first direction, and a third wall extending outwardly from the first wall in a second direction. Each of the first walls of each adjacent pair of the first plurality of clamps is longitudinally spaced apart by one of the second plurality of clamps. The second walls of the first plurality of clamps are transversely spaced apart from the second walls of the second plurality of clamps. The first walls and the second walls of the first plurality of clamps and the second plurality of clamps collectively define a first slot that receives the shaft. The first walls and the third walls of the first plurality of clamps and the second plurality of clamps collectively define a second slot for receiving the adjacent components.

Another aspect of the present disclosure is directed to a gas turbine including a compressor, a combustion section, and a turbine. The gas turbine further includes a first component, a second component positioned adjacent to the first component, and a clamping assembly. The clamping assembly includes a shaft, a first plurality of clamps, and a second plurality of clamps. Each of the first plurality of clamps and the second plurality of clamps includes a first wall, a second wall extending outwardly from the first wall in a first direction, and a third wall extending outwardly from the first wall in a second direction. Each of the first walls of each adjacent pair of the first plurality of clamps is longitudinally spaced apart by one of the second plurality of clamps. The second walls of the first plurality of clamps are transversely spaced apart from the second walls of the second plurality of clamps. The shaft is positioned in a first slot collectively defined by the first walls and the second walls of the first plurality of clamps and the second plurality of clamps. The first component and the second component are positioned in a second slot collectively defined by the first walls and the third walls of the first plurality of clamps and the second plurality of clamps.

In a further aspect, the present disclosure is directed to a method of coupling two adjacent components. The method includes positioning a first plurality of clamps relative to a second plurality of clamps. Each of the first plurality of clamps and the second plurality of clamps includes a first wall and a second wall extending outwardly from the first wall. Furthermore, each of the first walls of each adjacent pair of the first plurality of clamps is longitudinally spaced apart by one of the second plurality of clamps. The method also includes inserting a shaft into a first slot collectively defined by the first walls and the second walls of the first plurality of clamps and the second plurality of clamps.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a turbine shroud incorporated into a turbofan jet engine for purposes of illustration, one of ordinary skill in the art will readily appreciate that embodiments of the present invention may be applied to any turbine incorporated into any turbomachine and are not limited to a gas turbofan jet engine unless specifically recited in the claims.

The clamping assembly disclosed herein includes a key, a first plurality of clamps, and a second plurality of clamps. Each of the first and the second pluralities of clamps include corresponding first walls, second walls, and third walls. In particular, the second and the third walls extend outwardly from opposite ends of the first walls in opposite directions. Furthermore, the second and third walls of the first plurality of clamps are respectively spaced apart from the second and the third walls of the second plurality of clamps. The key is positioned between the second walls of the first and the second pluralities of clamps. When temperature increases, the key thermally expands at the same rate or at a faster rate than the first and the second pluralities of clamps. In this respect, the clamping assembly maintains or increases clamping force exerted on the coupled components when temperature increases.

Figure 1:
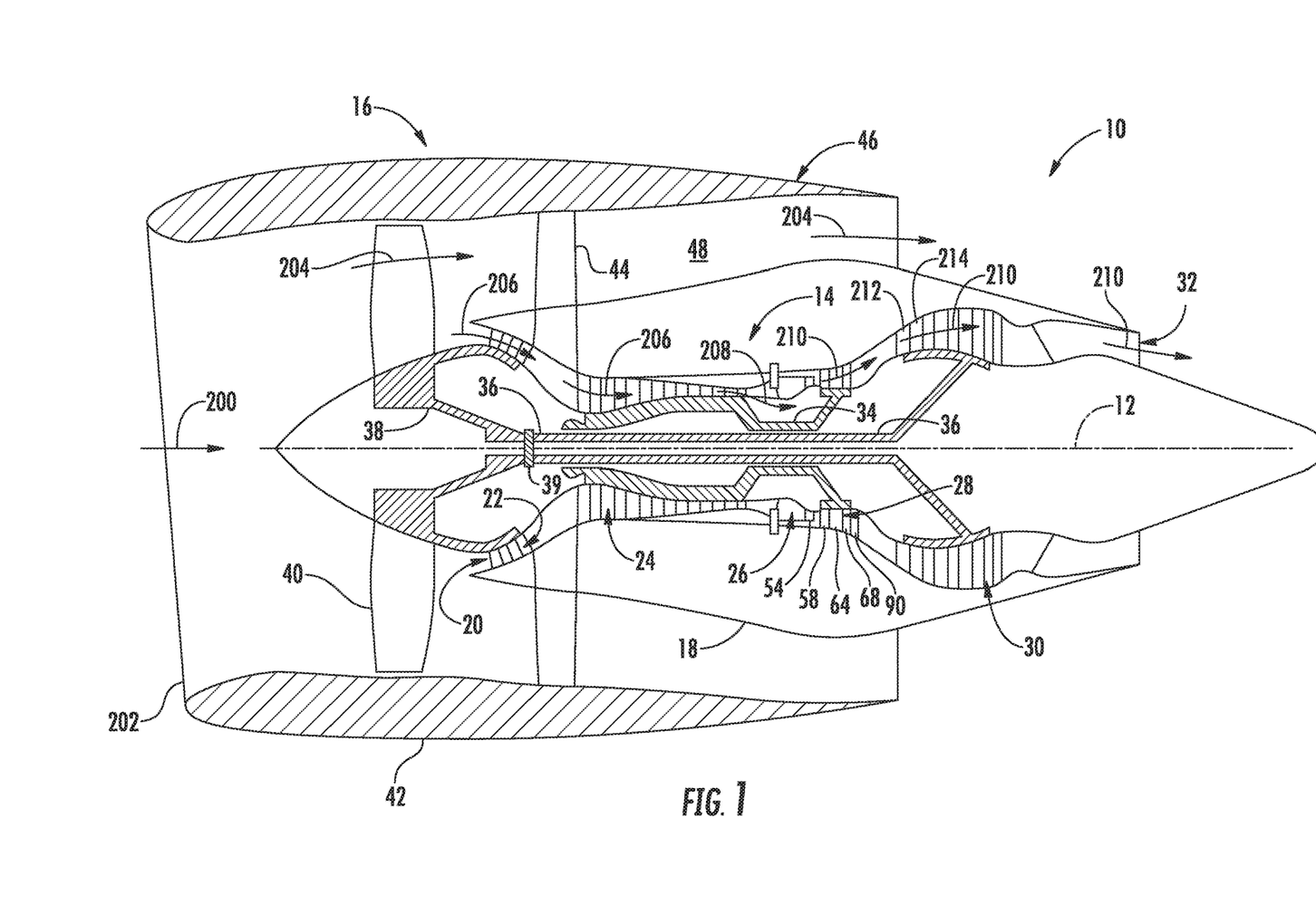
FIG. 1 is a schematic cross-sectional view of an exemplary high bypass turbofan jet engine in accordance with the embodiments disclosed herein.

Referring now to the drawings, wherein identical numerals indicate the same elements throughout the figures, FIG. 1 is a schematic cross-sectional view of an exemplary high bypass turbofan type gas turbine engine 10 ("turbofan 10") as may incorporate various embodiments disclosed herein. As shown in FIG. 1, the turbofan 10 has a longitudinal or axial centerline axis 12 extending therethrough for reference purposes. In general, the turbofan 10 may include a core turbine or gas turbine engine 14 disposed downstream from a fan section 16.

The gas turbine engine 14 may generally include a substantially tubular outer casing 18 that defines an annular inlet 20. The outer casing 18 may be formed from multiple casings. The outer casing 18 encases, in serial flow relationship, a compressor section having a booster or low pressure compressor 22 ("LP compressor 22") and a high pressure compressor 24 ("HP compressor 24"), a combustion section 26, a turbine section having a high pressure turbine 28 ("HP turbine 28") and a low pressure turbine 30 ("LP turbine 30"), and a jet exhaust nozzle section 32. A high pressure shaft or spool 34 ("HP shaft 34") drivingly couples the HP turbine 28 to the HP compressor 24. A low pressure shaft or spool 36 ("LP shaft 36") drivingly couples the LP turbine 30 to the LP compressor 22. The LP shaft 36 may also connect to a fan spool or shaft 38 of the fan section 16. In some embodiments, the LP shaft 36 may connect directly to the fan spool 38, such as in a direct-drive configuration. In alternative configurations, the LP shaft 36 may connect to the fan spool 38 via a reduction gear 39, such as in an indirect-drive or geared-drive configuration.

As shown in FIG. 1, the fan section 16 includes a plurality of fan blades 40 coupled to and extending radially outwardly from the fan spool 38. An annular fan casing or nacelle 42 circumferentially encloses the fan section 16 and/or at least a portion of the gas turbine engine 14. The nacelle 42 may be supported relative to the gas turbine engine 14 by a plurality of circumferentially-spaced outlet guide vanes 44. Moreover, a downstream section 46 of the nacelle 42 may extend over an outer portion of the gas turbine engine 14 to define a bypass airflow passage 48 therebetween.

Figure 2:
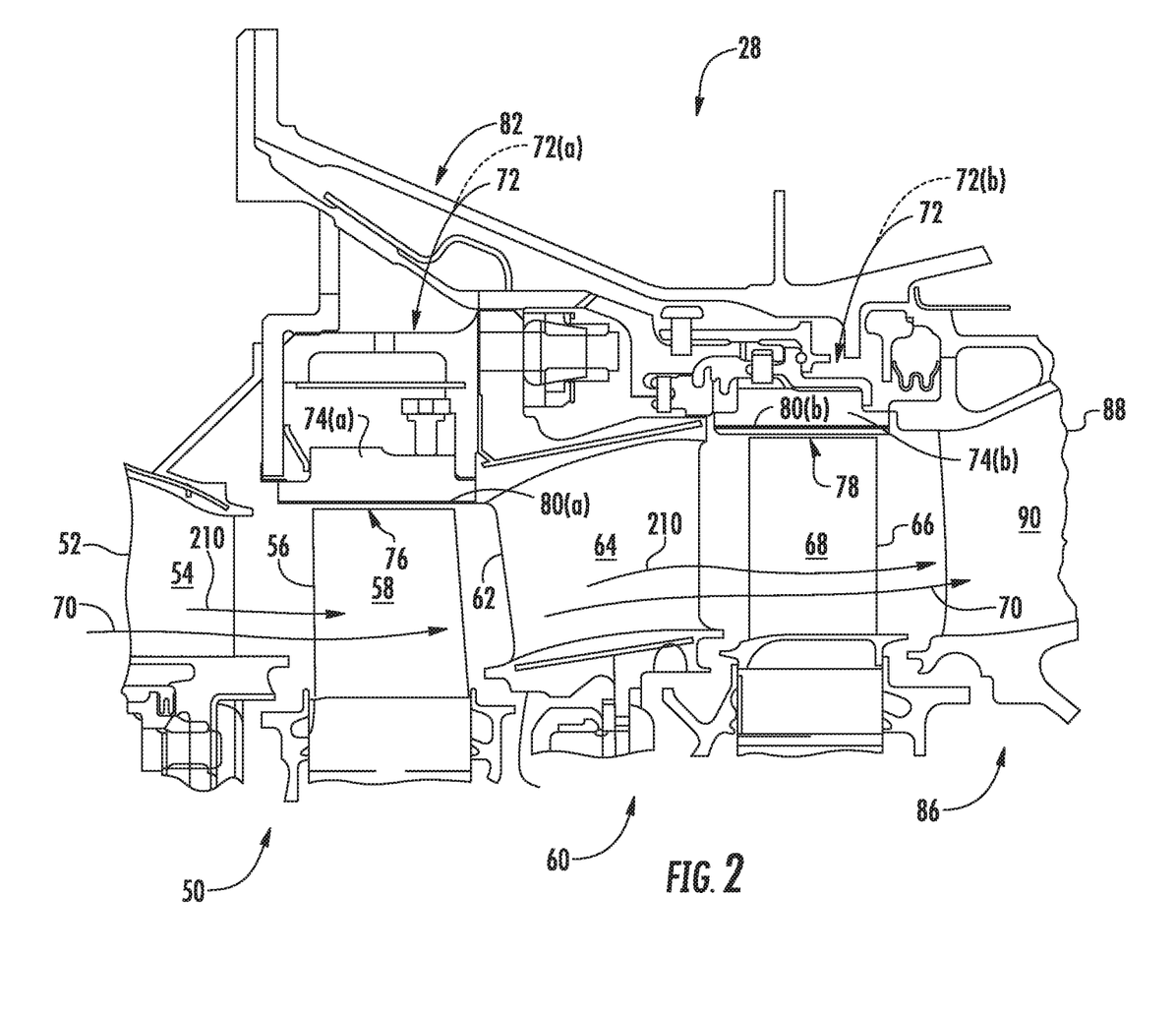
FIG. 2 is a cross-sectional side view of a high pressure turbine portion of the gas turbine engine shown in FIG. 1, illustrating several rows of turbine nozzles.

FIG. 2 is a cross-sectional view of the HP turbine 28 portion of the gas turbine engine 14 shown in FIG. 1, which may incorporate various embodiments disclosed herein. As shown in FIG. 2, the HP turbine 28 includes, in serial flow relationship, a first stage 50 having a row 52 of one or more turbine nozzles 54 (only one shown) axially spaced apart from a row 56 of one or more turbine rotor blades 58 (only one shown). The HP turbine 28 further includes a second stage 60 having a row 62 of one or more turbine nozzles 64 (only one shown) axially spaced apart from a row 66 of one or more turbine rotor blades 68 (only one shown). The HP turbine 28 may include a third stage 86 having a row 88 of one or more turbine nozzles 90 (only one shown). Although not shown in FIG. 2, the third stage 86 may also include a row of turbine rotor blades.

The turbine rotor blades 58, 68 extend radially outwardly from and are coupled to the HP shaft 34 (FIG. 1). As shown in FIG. 2, the turbine nozzles 54, 64, 90 and the turbine rotor blades 58, 68 at least partially define a hot gas path 70 for routing combustion gases from the combustion section 26 (FIG. 1) through the HP turbine 28. As shown in FIG. 1, the rows 52, 62, 88 of the turbine nozzles 54, 64, 90 are annularly arranged about the HP shaft 34 and the rows 56, 66 of the turbine rotor blades 58, 68 are circumferentially spaced around the HP shaft 34.

As shown in FIG. 2, various embodiments of the HP turbine 28 include at least one turbine shroud assembly 72. For example, the HP turbine 28 may include a first turbine shroud assembly 72(a) and a second turbine shroud assembly 72(b). Each turbine shroud assembly 72(a), 72(b) generally forms a ring or shroud around the corresponding row 56, 66 of turbine rotor blades 58, 68. Each turbine shroud assembly 72(a), 72(b) includes a turbine shroud or shroud seal 74(a), 74(b) radially spaced from blade tips 76, 78 of the turbine rotor blades 58, 68. This arrangement forms clearance gaps between the blade tips 76, 78 and sealing surfaces or hot side surfaces 80(a), 80(b). It is generally desirable to minimize the clearance gap between the blade tips 76, 78 and the turbine shrouds 74(a), 74(b), particularly during cruising operation of the turbofan 10, to reduce leakage from the hot gas path 70 over the blade tips 76, 78 and through the clearance gaps.

In particular embodiments, at least one of the turbine shrouds 74(a), 74(b) may be formed as a continuous, unitary, or seamless ring. Each turbine shroud assembly 72(a), 72(b) may be connected to a static structure such as a backbone or casing 82 of the gas turbine engine 14.

As illustrated in FIG. 1, air 200 enters an inlet portion 202 of the turbofan 10 during operation thereof. A first portion 204 of the air 200 flows into the bypass flow passage 48, and a second portion 206 of the air 200 enters the inlet 20 of the LP compressor 22. The LP compressor 22 progressively compresses the second portion of air 206 flowing therethrough en route to the HP compressor 24. The HP compressor 24 further compresses the second portion of the air 206 flowing therethrough 24, thus providing compressed air 208 to the combustion section 26 where it mixes with fuel and burns to provide combustion gases 210.

The combustion gases 210 flow through the HP turbine 28 where the turbine nozzles 54, 64, 90 and turbine rotor blades 58, 68 extract a first portion of kinetic and/or thermal energy from the combustion gases 210. This energy extraction supports operation of the HP compressor 24. The combustion gases 210 then flow through the LP turbine 30 where sequential stages of LP turbine nozzles 212 and LP turbine rotor blades 214 coupled to the LP shaft 36 extract a second portion of thermal and kinetic energy from the combustion gases 210. This energy extraction causes the LP shaft 36 to rotate, thereby supporting operation of the LP compressor 22 and/or rotation of the fan spool or shaft 38. The combustion gases 210 then exit through the jet exhaust nozzle section 32 of the gas turbine engine 14.

Along with the turbofan 10, the core turbine 14 serves a similar purpose and sees a similar environment in land-based gas turbines, turbojet engines in which the ratio of the first portion of air 204 to the second portion of air 206 is less than that of a turbofan, and unducted fan engines in which the fan section 16 is devoid of the nacelle 42. In each of the turbofan, turbojet, and unducted engines, a speed reduction device (e.g., the reduction gearbox 39) may be included between any shafts and spools. For example, the reduction gearbox 39 may be disposed between the LP shaft 36 and the fan shaft 38 of the fan section 16.

Figure 3:
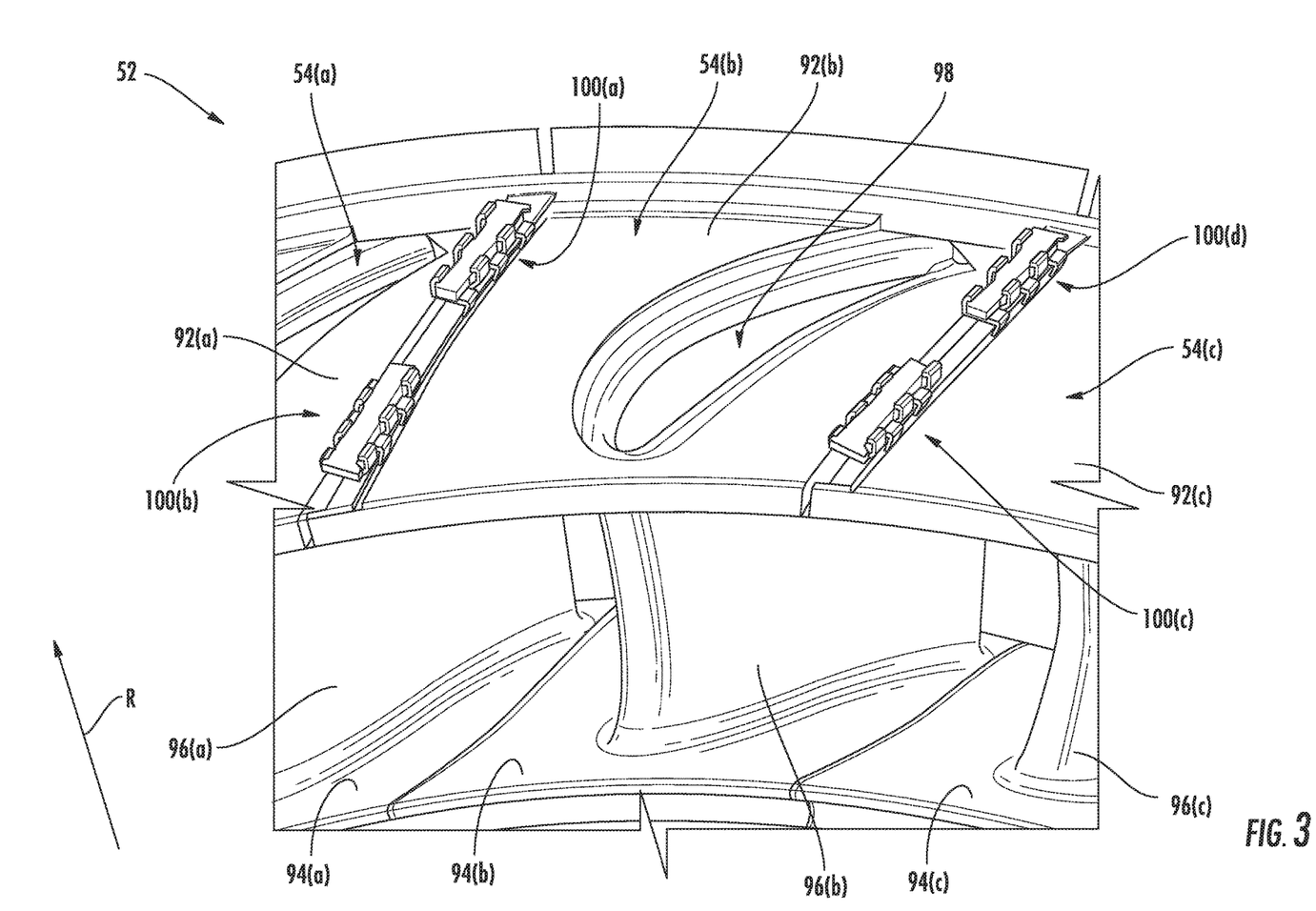
FIG. 3 is a perspective view of one of the rows of turbine nozzles, illustrating the location of several clamping assemblies for coupling a first turbine nozzle, a second turbine nozzle, and a third turbine nozzle.

FIG. 3 is a perspective view of a first turbine nozzle 54(a), a second turbine nozzle 54(b), and a third turbine nozzle 54(c), which form a portion of the row 52 of turbine nozzles 54. The row 54 defines a radial direction R. Although only a portion of the row 52 is shown in FIG. 3 for the purposes of clarity, the turbine nozzles 54 in the row 52 are annularly arranged to form a 360 degree ring. In this respect, the row 52 may include as many or as few turbine nozzles 54 as is necessary or desired. Each of the turbine nozzles 54(a-c) includes a corresponding outer band 92(a), 92(b), 92(c) radially spaced apart from a corresponding inner band 94(a), 94(b), 94(c). A corresponding airfoil 96(a), 96(b), 96(c) extends in span between the outer bands 92(a-c) and the inner bands 94(a-c). In this respect, the turbine nozzles 54(a-c) shown in FIG. 3 are referred to in the industry as singlets. Nevertheless, the turbine nozzles 54(a-c) may each include two airfoils (i.e., doublets), three airfoils (i.e., triplets), or more airfoils. As illustrated in FIG. 3, the second airfoil 96(b) defines an internal cavity 98. Although, the turbine nozzles 96(a-c) may be solid as well.

The turbine nozzles 54 are preferably constructed from a CMC material. In one embodiment, the CMC material used may be a continuous fiber reinforced CMC material. For example, suitable continuous fiber reinforced CMC materials include CMC materials reinforced with continuous carbon fibers, oxide fibers, silicon carbide monofilament fibers, and other CMC materials including continuous fiber lay-ups and/or woven fiber preforms. In other embodiments, the CMC material may be a discontinuous reinforced CMC material. For instance, suitable discontinuous reinforced CMC materials include particulate, platelet, whisker, discontinuous fiber, in situ, and nano-composite reinforced CMC materials. In other embodiments, the turbine nozzles 54 may be formed from other suitable composite materials or metallic materials.

As illustrated in FIG. 3, the second turbine nozzle 54(b) is coupled to the first turbine nozzle 54(a) and the third turbine nozzle 54(c). More specifically, a first clamping assembly 100(a) and a second clamping assembly 100(b) couple the outer bands 92(a-b) of the first and the second turbine nozzles 54(a-b). Similarly, a third clamping assembly 100(c) and a fourth clamping assembly 100(d) couple the outer bands 92(b-c) of the second and the third turbine nozzles 54(b-c). In this respect, two clamping assemblies 100 couple the outer bands 96 each adjacent pair of nozzles 54. Although, the outer bands 96 of each adjacent pair of nozzles 54 may be coupled by one clamping assembly 100, three clamping assemblies 100, or more clamping assemblies 100 as is necessary or desired. While not shown, the inner bands 94 of each adjacent pair of nozzles 54 may be coupled by one or more clamping assemblies 100. Furthermore, the clamping assemblies 100 are positioned on the radially outer side of the outer bands 92 and/or the radially inner sides of the inner bands 94. As such, the clamping assemblies 100 are separated from the combustion gases 210 flowing through the hot gas path 70 by the outer and/or the inner bands 92, 96. Each of the turbine nozzles of the row 52 not shown in FIG. 3 may be similarly coupled to each adjacent turbine nozzle.

Figure 4:
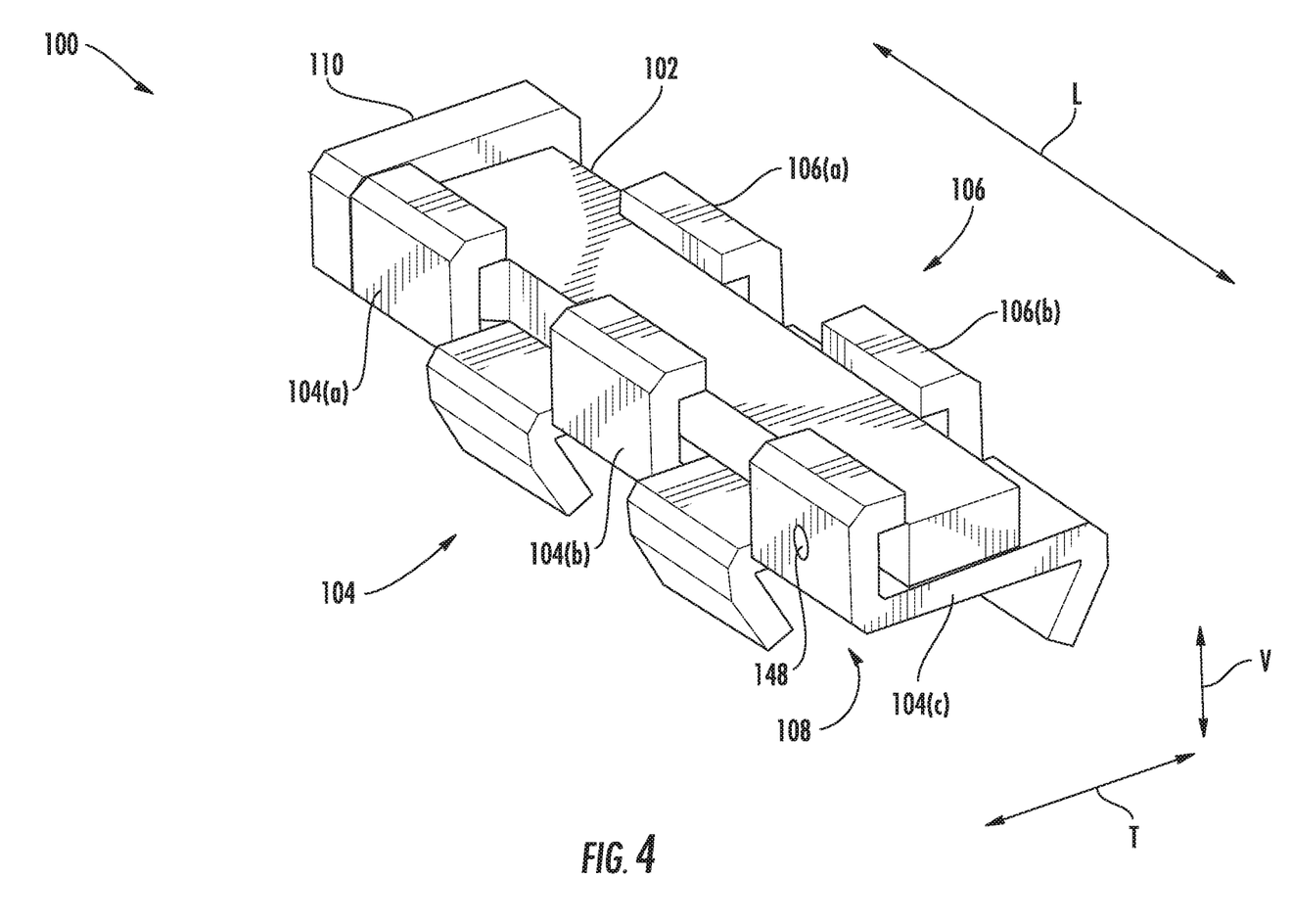
FIG. 4 is a perspective view of one of the clamping assemblies in accordance with the embodiments disclosed herein, illustrating a key, a first plurality of clamps, and a second plurality of clamps.
Figure 5:
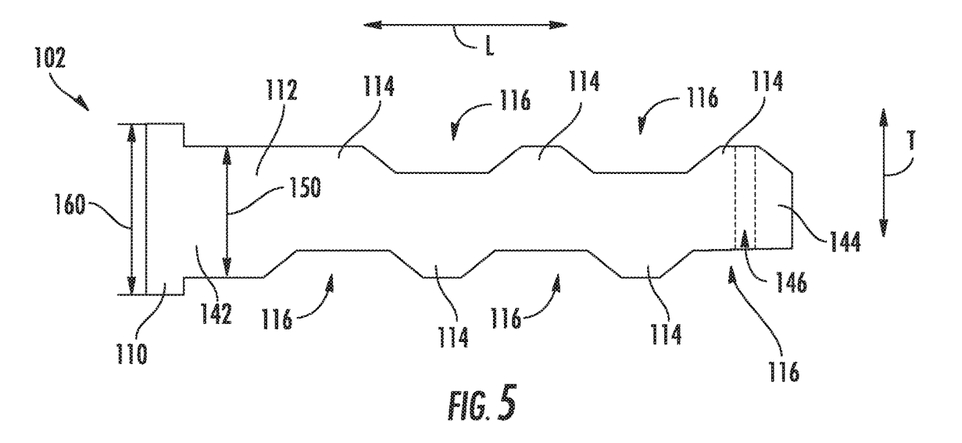
FIG. 5 is a top view of the key, illustrating the various features thereof.
Figure 6:
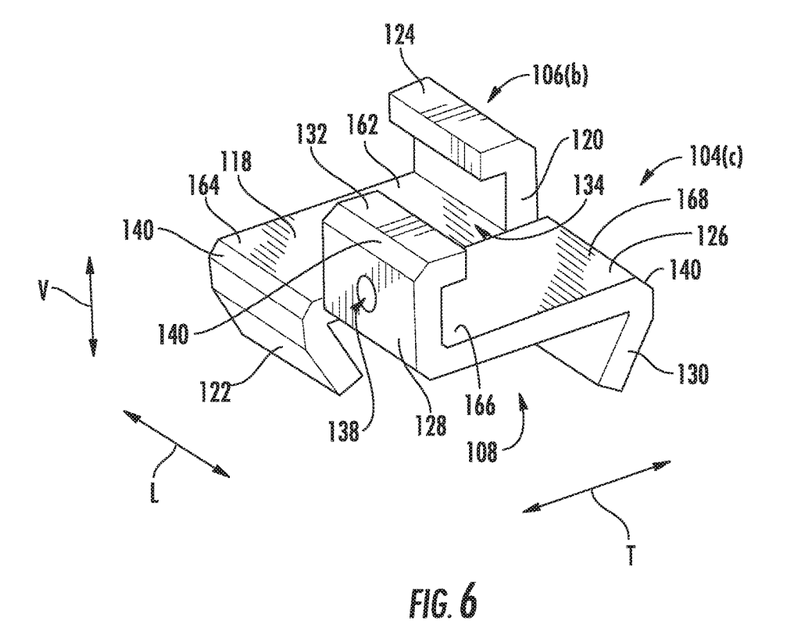
FIG. 6 is a perspective view of one of the first plurality of clamps and one of the second plurality of clamps.
Figure 7:
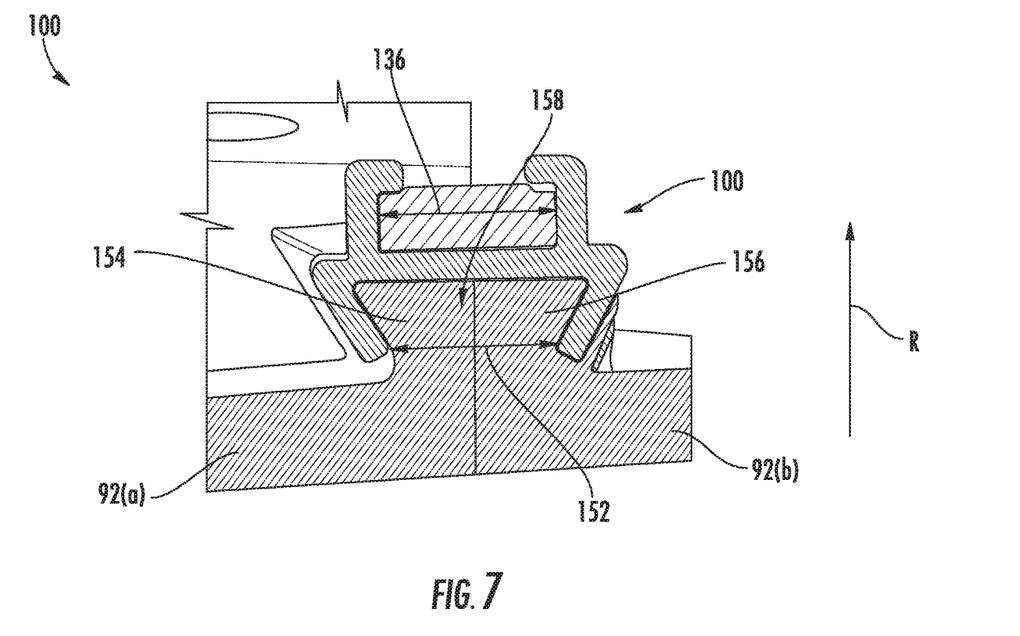
FIG. 7 is a side view of the clamping assembly, illustrating a dovetail connection with the first and the second turbine nozzles.

FIGS. 4-7 illustrate one embodiment of the clamping assembly 100. More specifically, FIG. 4 is a perspective view of the clamping assembly 100, illustrating a key 102, a first plurality of clamps 104, and a second plurality of clamps 106. FIG. 5 is a top view of the key 102. FIG. 6 is a perspective view of one of the first plurality of clamps 104 and one of the second plurality of clamps 106. FIG. 7 is a side view of the clamping assembly 100, illustrating a dovetail-type connection with the first and the second turbine nozzles 54(a), 54(b) for retaining the clamping assembly 100.

As illustrated in FIGS. 4-6, the clamping assembly 100 defines a longitudinal direction L, a transverse direction T generally orthogonal to the longitudinal direction L, and a vertical direction V generally orthogonal to the longitudinal direction L and the transverse direction T.

FIGS. 4-5 illustrate the key 102 of the clamping assembly 100. More specifically, the key 102 includes a shaft 112 having a first end 142 and a second end 144. The shaft 112 also defines a transverse length 150. As illustrated in FIGS. 4-5, the shaft 112 has a rectangular cross-section; although, the shaft 112 may have any suitable polygonal (e.g., hexagonal) or non-polygonal (e.g., circular) cross-sectional shape.

A flange 110 having a transverse length 160 is positioned on the first end 142 of the shaft 112. The transverse length 160 of the flange 110 is longer than the transverse length 150 of the shaft 112. In this respect, the flange 110 extends transversely outward from the shaft 112. In some embodiments, the flange 110 may extend vertically outward from the shaft 112 as well. The flange 110 preferably has the same cross-sectional shape as the shaft 112 as shown in FIGS. 4-5; although, the flange 110 may have a different cross-sectional shape as well.

The second end 144 of the shaft 112 defines a shaft aperture 146 for receiving a pin 148. The shaft aperture 146 may extend through the entire transverse length 150 of the shaft 112 (i.e., a through hole) or only a portion thereof (i.e., a blind hole). As will be discussed in greater detail below, the flange 110 and the pin 148 collectively retain the first and the second pluralities of clamps 104, 106 in place along the shaft 112 of the key 102.

In the embodiment shown in FIGS. 4-5, the shaft 112 includes a plurality of longitudinally spaced apart cams 114. The cams 114 extend transversely outwardly from the shaft 112. Each adjacent pair of cams 114 defines a valley or notch 116 therebetween. As best shown in FIG. 5, the cams 114 of one transverse side of the shaft 112 are longitudinally aligned with the valleys 116 on the other transverse side of the shaft 112. While the shaft 112 shown in FIG. 5 includes five cams 114 defining five valleys 116, the shaft 112 may have any number of cams 114 and/or valleys 116. In other embodiments, however, the transverse sides of the shaft 112 may be smooth.

Referring again to FIG. 4, the clamping assembly 100 includes the first plurality of clamps 104 and the second plurality of clamps 106. In the embodiment shown in FIG. 4, the first plurality of clamps 104 includes three clamps 104(a), 104(b), 104(c) and the second plurality of clamps 106 includes two clamps 106(a), 106(b). Although in other embodiments of the clamping assembly 100, the first and the second pluralities of clamps 104, 106 may include more or less clamps as is necessary or desired. The first plurality of clamps 104 and the second plurality of clamps 106 each include a different number of clamps in embodiment illustrated in FIG. 4. Nevertheless, the first and the second pluralities of clamps 104, 106 may include the same number of clamps as well.

FIG. 6 shows one of the first plurality of clamps 104(c) and one of the second plurality of clamps 106(b) in greater detail. Notably, the first and the second plurality of clamps 104(a), 104(b), 104(c), 106(a), 106(b) shown in FIG. 4 are substantially similar to each other. In fact, the only difference in the embodiment shown in FIG. 4 is that the clamp 104(c) defines a clamp aperture 138 while the other clamps 104(a), 104(b), 106(a), 106(b) do not.

Referring again to FIG. 6, the clamp 106(b) includes a first wall 118 having a first end 162 and a second end 164. The first wall 118 is positioned in a plane defined by the longitudinal direction L and the transverse direction T. A second wall 120 extends vertically outwardly the first end 162 of the first wall 118 in a first direction. The second wall 120 may be perpendicularly oriented with respect to the first wall 118 as shown in FIG. 6 or angularly oriented with respect thereto. A third wall 122 extends vertically outward from the second end 164 of the first wall 118 in a second direction. The third wall 122 may be angularly oriented with respect to the first wall 118 as shown in FIG. 6 or perpendicularly oriented with respect thereto. In the embodiment shown in FIGS. 4 and 6, the clamp 106(b) also includes a fourth wall 124 extending transversely outwardly from the second wall 120. In this respect, the fourth wall 124 is longitudinally aligned with and vertically spaced apart from the first wall 118. As such, the fourth wall 124 is parallel to the first wall 118. Although, some embodiments may not include the fourth wall 124.

The clamp 104(c) includes a first wall 126 having a first end 166 and a second end 168. The first wall 126 is positioned in a plane defined by the longitudinal direction L and the transverse direction T. A second wall 128 extends vertically outwardly the first end 166 of the first wall 126 in a first direction. The second wall 128 may be perpendicularly oriented with respect to the first wall 126 as shown in FIG. 6 or angularly oriented with respect thereto. A third wall 130 extends vertically outward from the second end 168 of the first wall 126 in a second direction. The third wall 130 may be angularly oriented with respect to the first wall 126 as shown in FIG. 6 or perpendicularly oriented with respect thereto. In the embodiment shown in FIGS. 4 and 6, the clamp 104(c) also includes a fourth wall 132 extending transversely outwardly from the second wall 128. In this respect, the fourth wall 132 is longitudinally aligned with and vertically spaced apart from the first wall 126. As such, the fourth wall 132 is parallel to the first wall 126. Although, some embodiments may not include the fourth wall 132.

The second wall 128 of the clamp 104(c) defines the clamp aperture 138, which receives the pin 148 for securing the clamp 104(c) to the key 102. As mentioned above, the clamp 104(c) is the only one of the first or the second pluralities of clamps 104, 106 that defines the clamp aperture 138 in the embodiment shown in FIGS. 4 and 6. Although, the other clamps in the first and/or the second pluralities of clamps 104, 106 may define additional clamp apertures in other embodiments.

The clamps 104(c), 106(b) may include one or more chamfers 140 as shown in FIG. 6. For example, the chamfers 140 may be positioned between the first walls 118, 126 and the second walls 120, 128, between the first walls 118, 126 and the third walls 122, 130, and/or between the second walls 120, 128 and the fourth walls 124, 132. Moreover, any of the clamps in the first and/or the second pluralities of clamps 104, 106 may include one or more chamfers 140.

As illustrated in FIGS. 4 and 6, each of the first plurality of clamps 104 are longitudinally spaced apart by one of the second plurality of clamps 106. In the embodiment shown in FIG. 4, for example, the clamp 106(a) is positioned longitudinally between the clamp 104(a) and the clamp 104(b). Similarly, the clamp 106(b) is positioned longitudinally between the clamp 104(b) and the clamp 104(c). In this respect, the first walls 126 of each adjacent pair of the first plurality of clamps 104 are longitudinally spaced apart by the first wall 118 of one of the second plurality of clamps 106.

The second walls 128 of each of the first plurality of clamps 104 are transversely spaced apart from the second walls 120 of each of the second plurality of clamps 106 as illustrated in FIGS. 4 and 6. More specifically, the second walls 128 of the first plurality of clamps 104 are positioned proximate to one transverse side of the shaft 112, and the second walls 120 of the second plurality of clamps 106 are positioned proximate to the other transverse side of the shaft 112. In this respect, the second walls 120, 128 of the first and the second pluralities of clamps 104, 106 define a first slot 134 (FIG. 6) having a transverse length 136 (FIG. 7), which receives the shaft 112. In some embodiments, the transverse length 150 of the shaft 112 is longer than the transverse length 136 of the first slot 134, thereby creating a press-fit relationship between the shaft 112 and the first and the second pluralities of clamps 104, 106. If the shaft includes one or more cams 114, each of the one or more cams 114 may longitudinally align with and contact the second walls 120, 128 of the first and the second pluralities of clamps 104, 106. The cross-sectional shape of the first slot 134 should generally correspond to the cross-sectional shape of the shaft 112. Furthermore, the fourth walls 124, 132 are positioned transversely between the second walls 120, 128 in the embodiment shown in FIG. 6 if the first and/or the second pluralities of clamps 104, 106 include the respective fourth walls 124, 132.

As illustrated in FIGS. 4 and 6, the third walls 130 of each of the first plurality of clamps 104 are transversely spaced apart from the third walls 122 of each of the second plurality of clamps 106. More specifically, the third walls 130 of the first plurality of clamps 104 are positioned proximate one transverse side of the shaft 112, and the third walls 122 of the second plurality of clamps 106 are positioned proximate to the other transverse side of the shaft 112. In this respect, the second walls 128 of the first plurality of clamps 104 are positioned proximate to the same transverse side of the shaft 112 as the third walls 122 of the second plurality of the clamps 106. Similarly, the third walls 130 of the first plurality of clamps 104 are positioned proximate to the same transverse side of the shaft 112 as the second walls 120 of the second plurality of the clamps 106.

Referring now to FIGS. 6 and 7, the second walls 120, 128 of the first and the second pluralities of clamps 104, 106 define a second slot 108 having a transverse length 152. The second slot 108 receives a first boss 154 positioned on the first turbine nozzle 92(a) and a second boss 156 positioned on the first turbine nozzle 92(a). In this respect, the cross-sectional shape of the second slot 108 should generally correspond to the cross-sectional shape of the first and the second bosses 154, 156 when joined together. In the embodiment shown in FIG. 7, for example, the first and the second bosses 154, 156 collectively form a dovetail 158. In this respect, the third walls 122, 130 of the first and the second plurality of clamps 104, 106 extend angularly inwardly in the transverse direction T toward each other to correspond to the dovetail 158 (i.e., form a cross-section complementary to the dovetail 158). That is, the third walls 122 of the first plurality of clamps 104 extend angularly toward the third walls 130 of the second plurality of clamps 106, and the third walls 130 of the second plurality of clamps 106 extend angularly toward the third walls 122 of the first plurality of clamps 104 to form the dovetail connection. In this embodiment, the transverse length of the second slot 108 varies in the vertical direction V. As such, the transverse length 152 as used herein refers to the shortest transverse length of the second slot 108. In other embodiments, the first and the second bosses 154, 156 may collectively form other shapes as well (e.g., rectangular, hemispherical, circular, etc.) In this respect, the third walls 122, 130 extend outwardly from the corresponding first walls 118, 126 in a manner such that the second slot 108 has a corresponding shape to receive the first and the second bosses 154, 156. For example, the second slot 108 has a circular shape if the first and the second bosses 154, 156 form a circular shape.

As briefly mentioned above, the clamping assembly 100 couples the first and the second turbine nozzles 92(a), 92(b). More specifically, the shaft 112 of the key 102 exerts transversely outward force on the second walls 120, 128 of the first and the second plurality of clamps 104. This, in turn, causes the third walls 122, 130 of the first and the second pluralities of clamps 104, 106 to exert transversely inward force on the first and the second bosses 154, 156. This transversely inward force clamps the first and the second bosses 154, 156 together, thereby coupling the first and the second turbine nozzles 92(a), 92(b).

The flange 110 and the pin 148 collectively prevent longitudinally outward movement of the first and the second pluralities of clamps 104, 106. As the temperature of the clamping assembly increases, the clamps 104(a), 104(b), 104(c), 106(a), 106(b) tend to longitudinally move apart. In this respect, the flange 110 prevents the clamp 104(a) from moving to position longitudinally outward therefrom. Similarly, the pin 148 prevents the clamp 104(c) from moving longitudinally outward as well. In particular, the clamp aperture 138 is longitudinally aligned with the shaft aperture 146 to permit positioning of the pin 148 in the shaft aperture 146 and the clamp aperture 138. As such, the flange 110 and the pin 148 prevent the first and the second pluralities of clamps 104, 106 from sliding off of the shaft 112 in the longitudinal direction L.

The key 102, the first plurality of clamps 104, and the second plurality of clamps 106 are preferably formed from suitable metallic materials. In one embodiment, the key 102 is constructed from a first material, and the first and the second pluralities of clamps 104, 106 are constructed from a second material. The first material has a greater coefficient of thermal expansion than the second material. As such, the key 102 thermally expands at a greater rate than the first and the second pluralities of clamps 104, 106, thereby increasing the clamping force exerted by the clamping assembly 100 on the first and the second turbine nozzles 92(a), 92(b) as temperature increases. That is, the transverse sides of the shaft 112 expand transversely outwardly faster than the second walls 120, 128. This, in turn, squeezes the third wall 122, 130 transversely inward against the first and the second bosses 154, 156, thereby increasing clamping force. As such, the transverse length 152 of the second slot 108 decreases as temperature increases. In this embodiment, the first material may be HASTELLOY® X alloy, and the second material may be Rene® 41 alloy. In alternate embodiments, the key 102, the first plurality of clamps 104, and the second plurality of clamps 106 may be constructed from the same material in order to maintain a constant clamp force as temperature increases. In these embodiments, the transverse length 152 of the second slot 108 remains the same as temperature increases.

Although the clamping assembly 100 is described above in the context of coupling adjacent turbine nozzles 54 in the row 52, the clamping assembly 100 couple turbine nozzles in any row in the HP turbine 28 or the LP turbine 30. Furthermore, the clamping assembly 100 may couple adjacent compressor nozzles in the LP compressor 22 or the HP compressor 24. In fact, the clamping assembly 100 may be used to couple any two adjacent components in the turbofan 10.

Figure 8:
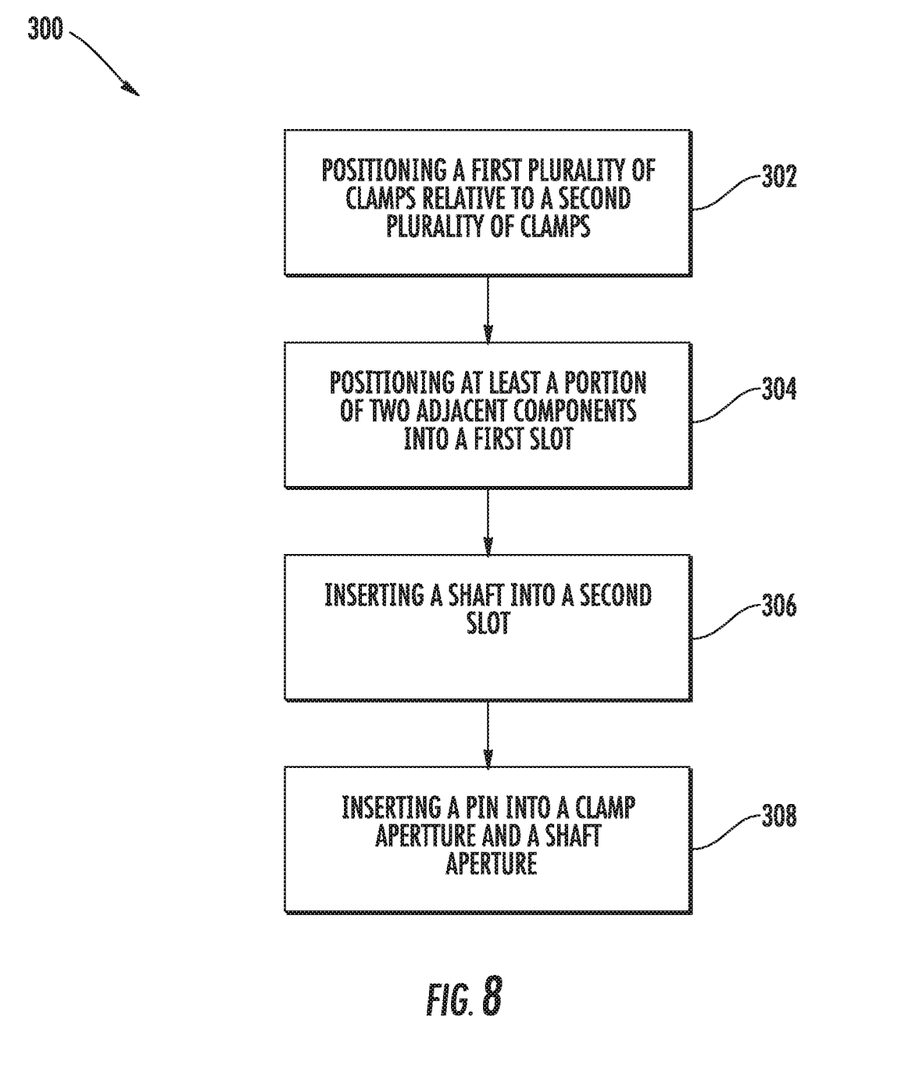
FIG. 8 is a flow chart illustrating one embodiment of a method of coupling two adjacent components.

FIG. 8 is a flow chart illustrating one embodiment of a method (300) of coupling two adjacent components, such as the first turbine nozzle 54(a) and second turbine nozzle 54(b) or the second turbine nozzle 54(b) and the third turbine nozzle 54(c). Although, the method (300) may be used to couple any suitable adjacent components.

In step (302), the first plurality clamps 104 are positioned relative to a second plurality of clamps 106. As described in greater detail above, each of the first and the second pluralities of clamps 104, 106 includes the corresponding first walls 118, 126. The corresponding second walls 120, 128 extend outwardly from the first walls 118, 126 in a first direction. The corresponding third walls 122, 130 extend outwardly from the first walls 118, 126 in a second direction. In particular, each of the first walls 118 of each adjacent pair of the first plurality of clamps 104 are longitudinally spaced apart by one of the second plurality of clamps 106.

In step (304), at least a portion of the two adjacent components are positioned in the second slot 108 collectively defined by the first walls 118, 126 and the third walls 122, 130 of the first and the second pluralities of clamps 104, 106. In some embodiments, the first boss 154 of the first turbine nozzle 54(a) and the second boss 156 of the second turbine nozzle 54(b) may be positioned in the second slot 108. Furthermore, this connection may be a dovetail connection as described in greater detail above. In alternate embodiments, the different portions of the first turbine nozzle 54(a) and the second turbine nozzle 54(b) may be positioned in the second slot 108. Furthermore, any portion of any two suitable adjacent components or even the entirety of the two suitable adjacent components may be positioned in the second slot 108.

The shaft 112 of the key 102 is inserted into the first slot 134 collectively defined by the first walls 118, 126 and the second walls 120, 128 of the first and the second pluralities of clamps 104, 106 in step (306). The shaft 112 may be inserted into the first slot 134 until the clamp aperture 138 and the shaft aperture 146 are longitudinally aligned. As mentioned above, the transverse length 150 of the shaft 112 may be longer than the transverse length 136 of the first slot 134 in some embodiments. As such, a press-fit relationship between the shaft 112 and the first and the second pluralities of clamps 104, 106 may be created. In step (308), the pin 148 is inserted into the clamp aperture 138 and the shaft aperture 146.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A clamping assembly for coupling adjacent components of a gas turbine engine, wherein the clamping assembly defines a longitudinal direction, a transverse direction orthogonal to the longitudinal direction, and a vertical direction orthogonal to the longitudinal and transverse directions, the clamping assembly comprising:
a shaft;
a first plurality of clamps connected to a first gas turbine engine component; and
a second plurality of clamps connected to a second gas turbine engine component, each of the first plurality of clamps and the second plurality of clamps comprising:
a first wall defining a first end and a second end each separated along the transverse direction;
a second wall extending outwardly along the vertical direction from the first wall in a first direction from the first end; and
a third wall extending outwardly along the vertical direction from the first wall from the second end in a second direction opposite of the first direction;
wherein each of the first walls of each adjacent pair of the first plurality of clamps is longitudinally spaced apart by one of the second plurality of clamps;
wherein the second walls of the first plurality of clamps are transversely spaced apart from the second walls of the second plurality of clamps; and
wherein the first walls and the second walls of the first plurality of clamps and the second plurality of clamps collectively define a first slot that receives the shaft and the first walls and the third walls of the first plurality of clamps and the second plurality of clamps collectively define a second slot for receiving the first gas turbine engine component and second gas turbine engine component.

2. The clamping assembly of claim 1, wherein the shaft comprises a rectangular cross-section.

3. The clamping assembly of claim 1, wherein the shaft includes one or more cams.

4. The clamping assembly of claim 1, wherein the shaft comprises a first end and a second end, and wherein the first end comprises a flange and the second end defines a shaft aperture for receiving a pin.

5. The clamping assembly of claim 4, wherein one of the first plurality of clamps or one of the second plurality of clamps defines a clamp aperture, and wherein the clamp aperture is longitudinally aligned with the shaft aperture to permit positioning of the pin in the shaft aperture and the clamp aperture.

6. The clamping assembly of claim 1, wherein each of the first plurality of clamps and each of the second plurality of clamps comprises a fourth wall extending outwardly from the second wall, and wherein the fourth wall is parallel to the first wall.

7. The clamping assembly of claim 1, wherein the third walls of the first plurality of clamps extend angularly toward the third walls of the second plurality of clamps and the third walls of the second plurality of clamps extend angularly toward the third walls of the first plurality of clamps to form a dovetail connection with the adjacent components.

8. The clamping assembly of claim 1, wherein a transverse length of the shaft is longer than a transverse length of the first slot.

9. The clamping assembly of claim 1, wherein the shaft is formed from a first material and the first plurality of clamps and the second plurality of clamps are formed from a second material, and wherein the first material has a greater coefficient of thermal expansion than the second material.

10. The clamping assembly of claim 9, wherein the first material and the second material are metals.

11. The clamping assembly of claim 1, wherein the adjacent components are formed from a CMC.

12. A method of coupling the two adjacent components of claim 1, comprising:
positioning the first plurality of clamps relative to the second plurality of clamps, wherein each of the first plurality of clamps and the second plurality of clamps comprises the first wall and the second wall extending outwardly from the first wall, and wherein each of the first walls of each adjacent pair of the first plurality of clamps is longitudinally spaced apart by one of the second plurality of clamps; and inserting the shaft into the first slot collectively defined by the first walls and the second walls of the first plurality of clamps and the second plurality of clamps.

13. A gas turbine, comprising:
a compressor;
a combustion section;
a turbine;
a first component;
a second component positioned adjacent to the first component; and
a clamping assembly defining a longitudinal direction, a transverse direction orthogonal to the longitudinal direction, and a vertical direction orthogonal to the longitudinal and transverse directions, wherein the clamping assembly comprises:
a shaft;
a first plurality of clamps; and
a second plurality of clamps, each of the first plurality of clamps and the second plurality of clamps comprising:
a first wall defining a first end and a second end each separated along the transverse direction;
a second wall extending outwardly along the vertical direction from the first wall in a first direction from the first end; and
a third wall extending outwardly along the vertical direction from the first wall from the second end in a second direction opposite of the first direction;
wherein each of the first walls of each adjacent pair of the first plurality of clamps is longitudinally spaced apart by one of the second plurality of clamps;
wherein the second walls of the first plurality of clamps are transversely spaced apart from the second walls of the second plurality of clamps; and
wherein the shaft is positioned in a first slot collectively defined by the first walls and the second walls of the first plurality of clamps and the second plurality of clamps and the first component and the second component are positioned in a second slot collectively defined by the first walls and the third walls of the first plurality of clamps and the second plurality of clamps.

14. The gas turbine of claim 13, wherein the first component and the second component are formed from a CMC, and wherein the shaft, the first plurality of clamps, and the second plurality of clamps are formed from a metal.

15. The gas turbine of claim 14, wherein the first component is a first nozzle section and the second component is a second nozzle section adjacent to the first nozzle section.

16. The gas turbine of claim 13, wherein the first component comprises a first boss and the second component comprises a second boss, and wherein the first boss and the second boss collectively form a dovetail.

17. The gas turbine of claim 16, wherein the second slot comprises a cross-sectional shape complementary to the dovetail.

18. The gas turbine of claim 13, wherein each of the first plurality of clamps and each of the second plurality of clamps comprises a fourth wall extending outwardly from the second wall, and wherein the fourth wall is parallel to the first wall.

19. The gas turbine of claim 13, wherein the shaft is formed from a first material and the first plurality of clamps and the second plurality of clamps are formed from a second material, and wherein the first material has a greater coefficient of thermal expansion than the second material.

20. The gas turbine of claim 13, wherein the shaft, the first plurality of clamps, and the second plurality of clamps are formed from the same material.

* * * * *